United States Patent
Byom et al.

(10) Patent No.: US 8,589,730 B2
(45) Date of Patent: Nov. 19, 2013

(54) HANDLING ERRORS DURING DEVICE BOOTUP FROM A NON-VOLATILE MEMORY

(75) Inventors: Matthew Byom, Campbell, CA (US);
Kenneth Herman, San Jose, CA (US);
Nir J. Wakrat, Los Altos, CA (US);
Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 12/872,867

(22) Filed: Aug. 31, 2010

(65) Prior Publication Data

US 2012/0054541 A1 Mar. 1, 2012

(51) Int. Cl.
*G06F 11/00* (2006.01)

(52) U.S. Cl.
USPC ............................................. 714/16; 714/6.1

(58) Field of Classification Search
USPC ........................................................... 714/36
See application file for complete search history.

(56) References Cited

U.S. PATENT DOCUMENTS

| | | | |
|---|---|---|---|
| 5,737,520 A * | 4/1998 | Gronlund et al. | 714/39 |
| 5,768,498 A * | 6/1998 | Boigelot et al. | 714/39 |
| 6,279,127 B1 * | 8/2001 | Moore | 714/47.3 |
| 6,463,550 B1 * | 10/2002 | Cepulis et al. | 714/25 |
| 6,496,945 B2 * | 12/2002 | Cepulis et al. | 714/25 |
| 6,591,272 B1 * | 7/2003 | Williams | 1/1 |
| 6,751,788 B1 * | 6/2004 | Goser | 717/127 |
| 6,970,970 B2 * | 11/2005 | Jung et al. | 711/103 |
| 7,870,378 B2 * | 1/2011 | Kuo et al. | 713/2 |
| 8,175,012 B2 * | 5/2012 | Chu et al. | 370/278 |
| 2001/0042225 A1 * | 11/2001 | Cepulis et al. | 714/25 |
| 2002/0066080 A1 * | 5/2002 | O'Dowd | 717/128 |
| 2003/0120980 A1 * | 6/2003 | Harris | 714/45 |
| 2003/0140282 A1 * | 7/2003 | Kaler et al. | 714/39 |
| 2003/0163765 A1 * | 8/2003 | Eckardt et al. | 714/36 |
| 2004/0003168 A1 * | 1/2004 | Kim et al. | 711/103 |
| 2004/0017708 A1 * | 1/2004 | Choi et al. | 365/200 |
| 2005/0229020 A1 * | 10/2005 | Goodman et al. | 714/2 |
| 2006/0236198 A1 | 10/2006 | Lintz, Jr. et al. | |
| 2006/0242398 A1 * | 10/2006 | Fontijn et al. | 713/2 |
| 2007/0055914 A1 * | 3/2007 | Chandwani et al. | 714/47 |
| 2007/0061634 A1 * | 3/2007 | Marisetty et al. | 714/48 |
| 2007/0211559 A1 * | 9/2007 | Choi et al. | 365/233 |

(Continued)

FOREIGN PATENT DOCUMENTS

| | | |
|---|---|---|
| JP | 2008-191701 | 8/2008 |
| WO | 2010/067901 | 6/2010 |

OTHER PUBLICATIONS

Spanjer, "Flash Management—Why and How?" Nov. 1, 2009, pp. 1-14, http://www.adtron.com/pdf/Flash%20Management%20%28FINAL%29.pdf.

(Continued)

*Primary Examiner* — Kamini Patel
(74) *Attorney, Agent, or Firm* — Van Court & Aldridge LLP

(57) ABSTRACT

Systems and methods are provided for handling errors during device bootup from a non-volatile memory ("NVM"). A NVM interface of an electronic device can be configured to detect errors and maintain an error log in volatile memory while the device is being booted up. Once device bootup has completed, a NVM driver of the electronic device can be configured to correct the detected errors using the error log. For example, the electronic device can move data to more reliable blocks and/or retire blocks that are close to failure, thereby improving overall device reliability.

19 Claims, 3 Drawing Sheets

(56) References Cited

U.S. PATENT DOCUMENTS

| | | | |
|---|---|---|---|
| 2007/0233858 A1* | 10/2007 | Goff et al. | 709/224 |
| 2008/0008001 A1* | 1/2008 | Kuroyanagi | 365/185.11 |
| 2008/0082814 A1* | 4/2008 | Kuo et al. | 713/2 |
| 2008/0256400 A1* | 10/2008 | Yang et al. | 714/57 |
| 2010/0251074 A1* | 9/2010 | Chu et al. | 714/773 |
| 2012/0017071 A1* | 1/2012 | Shahar et al. | 713/2 |

OTHER PUBLICATIONS

"Control Method for Handling Errors During Power-On Sequence." IBM Technical Disclosure Bulletin, vol. 32, No. 10B, p. 116, Mar. 1, 1990.

"Fully Reprogrammable Fault-Tolerant Flash Memory System." IBM Technical Disclosure Bulletin, vol. 38, No. 8, pp. 83-86, Aug. 1, 1995.

* cited by examiner

HANDLING ERRORS DURING DEVICE BOOTUP FROM A NON-VOLATILE MEMORY

BACKGROUND OF THE DISCLOSURE

NAND flash memory, as well as other types of non-volatile memories ("NVMs"), are commonly used in electronic devices for mass storage. For example, consumer electronics such as portable media players often include NAND flash memory to store music, videos, and other media programs.

When an electronic device is being powered up or rebooted, an operating system can be booted up from a NVM of the electronic device. The bootup of the operating system can proceed in multiple stages. For example, the electronic device can be configured to first load a bootloader from the NVM or a mask read-only memory ("ROM") to volatile memory. The electronic device can then use the bootloader to load the operating system and associated firmware from the NVM to the volatile memory.

In some situations, errors in the NVM can occur while a device is being booted up. If such errors are left uncorrected, these errors may result in data loss or render the device inoperable.

SUMMARY OF THE DISCLOSURE

Systems and methods are provided for handling errors during device bootup from a non-volatile memory ("NVM"), such as a NAND flash memory. An electronic device can use an error log in volatile memory in order to keep track of error notifications during device bootup when the device may only be capable of reading data from the NVM. For example, while the electronic device is being booted up from the NVM, a NVM interface of the device can detect errors and store one or more error notifications in the error log. Then, once the device has finished booting and has reached a state where writes to the device are possible, a NVM driver of the device can be configured to correct the previously detected errors using the error log.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for handling errors during device bootup from a non-volatile memory ("NVM") are provided. In order to prevent firmware failure and avoid data loss, a NVM interface of an electronic device can be configured to detect errors and maintain an error log in volatile memory while the device is being booted up. During this stage, the electronic device may be operating in a read-only context. As used herein, a "read-only context" can refer to a state of operation where an electronic device is unable to perform writes to a NVM, and consequently is also unable to correct any errors detected in the NVM.

Then, once the electronic device has entered a writeable context (e.g., device bootup has completed), a NVM driver of the electronic device can be configured to correct the detected errors using the error log. As used herein, a "writeable context" can refer to a state of operation where one or more components of an electronic device are capable of performing write operations to a NVM.

Accordingly, once the device has entered a writeable context, the NVM driver can move data to more reliable blocks and/or retire blocks that are close to failure. Consequently, firmware stored on the device can be used for a longer period of time without requiring any updates, and the occurrence of fatal errors can also be reduced.

Figure 1:
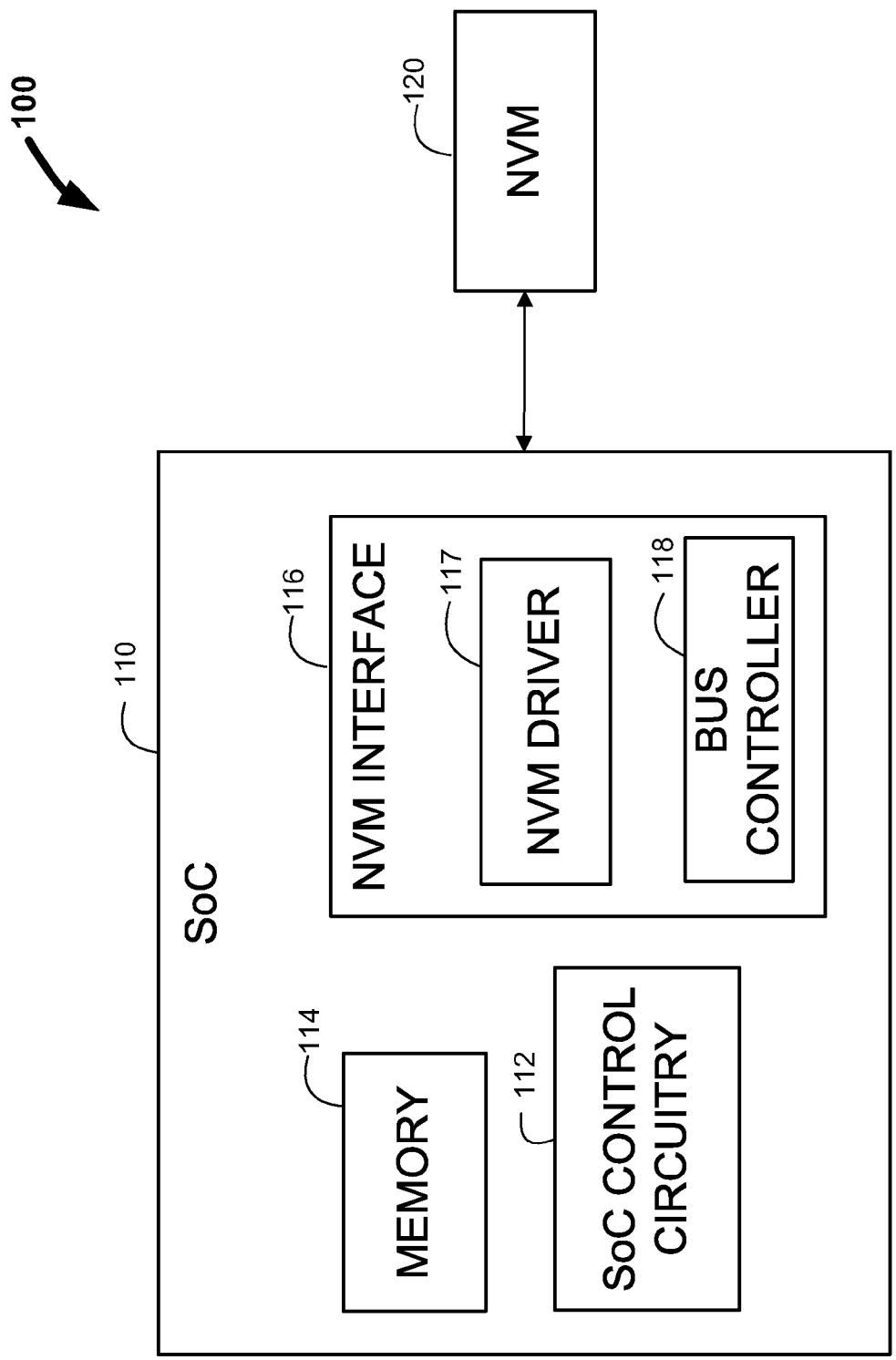
FIG. 1 is an illustrative block diagram of an electronic device configured in accordance with various embodiments of the invention.

FIG. 1 illustrates a block diagram of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which is the smallest erasable unit, and further organized into "pages", which can be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be referenced using a physical address (e.g., a physical page address or physical block address).

System-on-a-chip 110 can include SoC control circuitry 112, memory 114, and NVM interface 116. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 116 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114. SoC control circuitry 112 may operate under the control of a program, such as an application, operating system, NVM driver 117, or a bootloader loaded in memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112. In addition, one or more portions of memory 114 can be used to store an error log used during device bootup, an operating system, and associated firmware and kernel.

NVM interface 116 may include any suitable combination of hardware, software, and/or firmware configured to act as an interface or driver between NVM 120 and the operating system, application, bootloader, or other non-memory-specific or non-vendor-specific programs executed by SoC control circuitry 112. For any software modules included in NVM interface 116, corresponding program code may be stored in NVM 120 or memory 114.

NVM interface 116 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 116 can interpret the read or write commands from SoC control circuitry 112, perform wear leveling, and generate read and program instructions compatible with the bus protocol of NVM 120.

NVM interface 116 can include NVM driver 117 and bus controller 118. NVM driver 117 may include NVM-specific or vendor-specific software and/or firmware for interpreting memory access commands from a program. In some embodiments, NVM driver 117 can include multiple software modules or drivers that provide access to different portions of NVM 120. For example, NVM driver 117 can include a block device driver for providing access to at least some of the memory locations in NVM 120 through a file system. In addition, NVM driver 117 can include a separate non-volatile pre-boot storage driver (e.g., a mask ROM) for providing access to non-volatile pre-boot information stored in other memory locations in NVM 120 (e.g., information used by electronic device 100 during bootup).

NVM driver 117 can further include various software modules or drivers to provide a layered software interface between the operating system, for example, and NVM 120. NVM driver 117 can include lower level software modules that interface with NVM 120 and abstract away details of NVM 120 from higher level software modules of NVM driver 117, the operating system, and any applications. The lower level software modules can include, for example, drivers that group blocks of NVM 120 into super blocks for use by the higher level software modules. The lower level software modules can also include a non-volatile pre-boot storage driver.

In some embodiments, NVM driver 117 may be configured in a read-only context, where driver 117 is able to provide read-only access to NVM 120. The read-only context allows for smaller software modules and faster speeds. Thus, this context may be used during device bootups where writes to NVM 120 are generally unnecessary. In other embodiments, NVM driver 117 may be configured in a writeable context, where NVM driver 117 can direct bus controller 118 to perform one or more writes to NVM 120. In particular, while operating in the writeable context, NVM driver 117 may run software modules that are compiled for a writeable context of electronic device 100.

Bus controller 118 may include any suitable hardware components that enable NVM driver 117 to access NVM 120 using the bus specifications (e.g., data rate) of NVM 120. In some embodiments, which are not depicted in FIG. 1, NVM driver 117 and/or bus controller 118 may be implemented in a separate memory controller (e.g., flash controller) for NVM 120, such as in a flash memory drive. In these embodiments, SoC 110 or SoC control circuitry 112 may act as a host controller. For example, as the host controller, SoC 110 can issue read and write requests to NVM 120.

While NVM interface 116 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 116.

On power-up or reboot of electronic device 100, a bootloader may be loaded from NVM 120 to memory 114. Electronic device 100 can then use the bootloader to load data (e.g., an operating system and associated firmware and kernel) from NVM 120 to memory 114.

While the bootloader is reading and loading data stored in one or more blocks of NVM 120 to memory 114, errors may be detected in some of those blocks. For example, some errors may be non-fatal errors (e.g., indicated by the issuance of one or more refresh notifications), while others may be fatal errors (e.g., indicated by the issuance of one or more uncorrectable error correction coding ("uECC") notifications).

Several factors may prevent these errors from being corrected by device 100. One factor is that when data is being read by the bootloader, device 100 may operate in a read-only context where errors cannot be corrected. As mentioned previously, a "read-only context" can refer to a state of operation where an electronic device is unable to perform writes to a NVM, and consequently is unable to correct any errors detected in the NVM.

Another factor is that some of the detected errors may be transient. For example, during device bootup, electronic device 100 may receive one or more refresh notifications indicating that a refresh operation needs to be performed on a particular page or block. On subsequent reads of that page or block, however, device 100 may not receive any additional refresh notifications. Nevertheless, a refresh operation should still be performed on the page or block.

Moreover, because the data that is being loaded is read only by the bootloader, device 100 may be unable to re-detect these errors once device 100 has finished booting up. Hence, these errors may be left uncorrected after device bootup has completed.

As a result, while it would be preferable for these errors to be corrected as soon as possible (e.g., by retiring the one or more blocks or moving the stored data to different blocks in NVM 120), device 100 may continue to operate until the firmware fails to load (e.g., due to one or more fatal errors). This may then require a force restore to be performed on device 100.

Even after the completion of the force restore, the original errors may still remain uncorrected. In particular, during force restore, new firmware may be written to NVM 120. In some cases, the new firmware may be written to the same blocks where the old firmware was stored. Generally, device 100 may not re-detect the original errors because there is no protocol for device 100 to read out and inspect the old firmware before writing the new firmware to NVM 120.

One possible solution is for electronic device 100 to re-verify the firmware stored in memory 114 after the bootup process has completed. Nonetheless, using such an approach, device 100 may not be able to re-detect transient non-fatal errors. Furthermore, this approach can negatively impact device performance because device 100 is wasting time reading data when it would otherwise be fully functional.

Accordingly, in order to prevent firmware failure and avoid data loss, NVM interface 116 can be configured to detect errors and maintain an error log during device bootup. Once device 100 has entered a writeable context (e.g., device bootup has completed), NVM driver 117 can be configured to correct the detected errors using the error log. For example, NVM driver 117 can move data to more reliable blocks and/or retire blocks that are close to failure, thereby improving overall device reliability. As mentioned previously, a "writeable context" can refer to a state of operation where one or more components of an electronic device are capable of performing write operations to a NVM.

Figure 2:
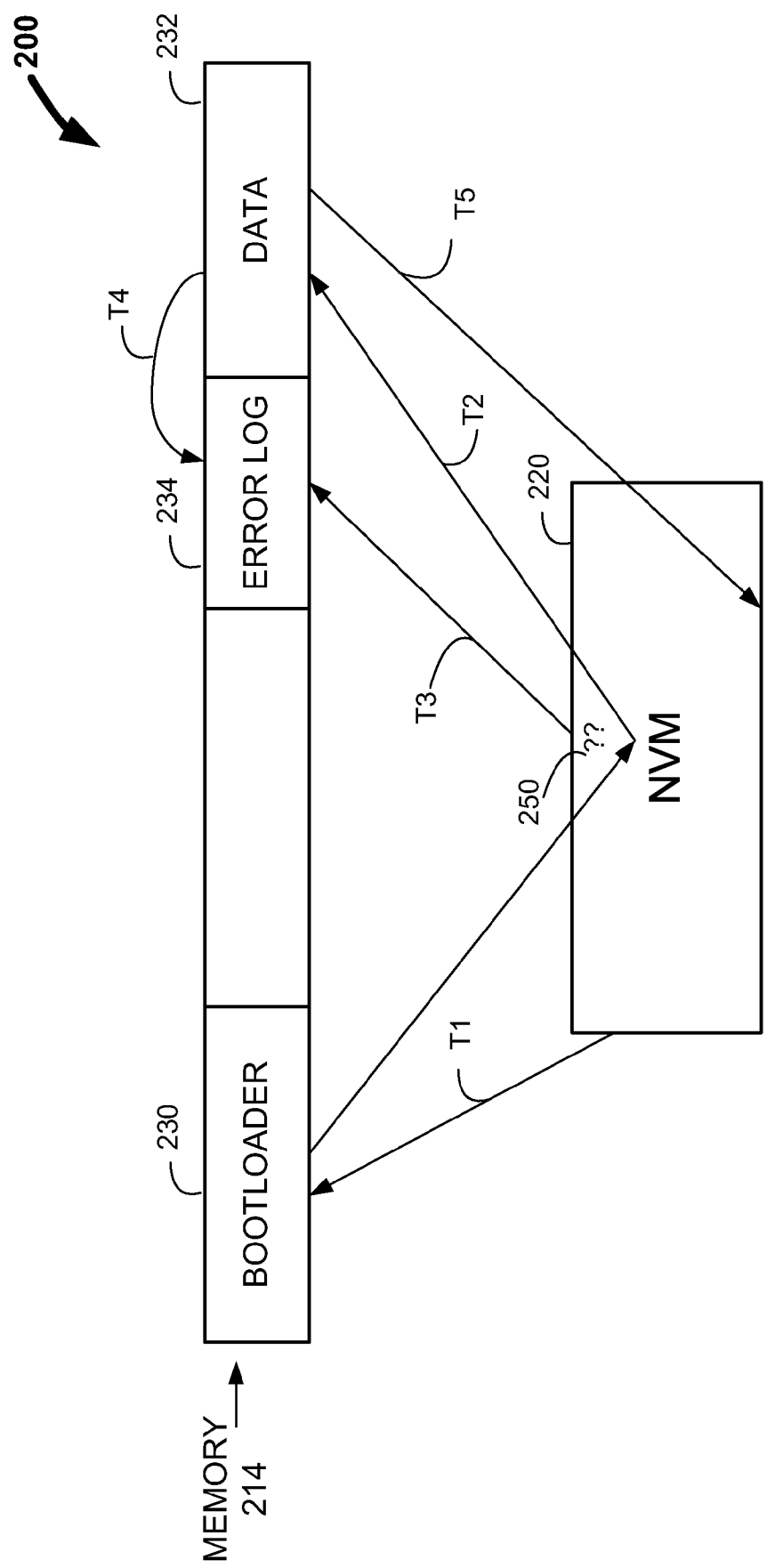
FIG. 2 is graphical view of an electronic device bootup in accordance with various embodiments of the invention.

Referring now to FIG. 2, an illustrative graphical view 200 of an electronic device bootup is shown. Memory 214 may be the same as or similar to memory 114 (FIG. 1). Likewise, NVM 220 may be the same as or similar to NVM 120 (FIG. 1).

It should be understood that portions 230-234 of memory 214 depicted in FIG. 2 are merely illustrative. For example, the depicted size of each portion is illustrative and should not be viewed as limiting embodiments to the depicted size. Also, it should be understood that the order of the portions may be rearranged into any suitable order.

In some embodiments, an operating system of an electronic device (e.g., electronic device 100 of FIG. 1) may be booted up from NVM 220 during power-up or reboot of the electronic device. As shown in FIG. 2, for instance, on power-up or reboot of the device during time period T1, bootloader 230 may be loaded from NVM 220 into volatile memory 214 through a NVM interface (e.g., NVM interface 116 of FIG. 1).

During time period T2, bootloader 230 may be configured to load the operating system and associated data into memory 214. For example, in addition to the operating system, the NVM interface may also load a kernel and firmware, which can be used to configure the operating system and/or can be used by the operating system to start up. In particular, the NVM interface can read the operating system, the kernel, and the firmware from one or more memory locations (e.g., one or more blocks) of the NVM. In some embodiments, the NVM interface can perform the read in a read-only context. Thus, as shown in FIG. 2, the operating system and associated data may be indicated by data 232, which can be loaded into memory 214 from NVM 220 through the NVM interface.

While data 232 is being loaded into memory 214, the NVM interface may detect one or more errors 250 in NVM 220 (e.g., one or more errors in the firmware that is being read from NVM 220). Upon detecting such an error, the NVM interface can store one or more error notifications (e.g., refresh notifications or uECC notifications) in a portion of memory 214. For instance, during time period T3, the NVM interface can store the one or more error notifications in an error log 234, which can be implemented as a scratch memory buffer and/or a reserved random-access memory area in memory 214.

Once the electronic device has booted (e.g., the operating system has been loaded into memory 214 and has started up), a NVM driver (e.g., NVM driver 117 of FIG. 1) can inspect error log 234 and perform one or more corrective actions. In particular, the NVM driver can operate in a writeable context, where it can direct a bus controller (e.g., bus controller 118 of FIG. 1) to perform one or more corrective actions.

Thus, during time period T4 of FIG. 2, a NVM driver can inspect error log 234. For instance, the NVM driver can process error log 234 and read the one or more error notifications.

Then, during time period T5, the NVM driver can correct errors 250 using the error notifications. For example, in response to reading one or more refresh notifications from error log 234, the NVM driver can refresh the data stored in a page or block of NVM 220 (e.g., by performing a garbage collection). As another example, in response to reading one or more uECC notifications from error log 234, the NVM driver can transmit notifications indicating that the device may need to be restored.

Figure 3:
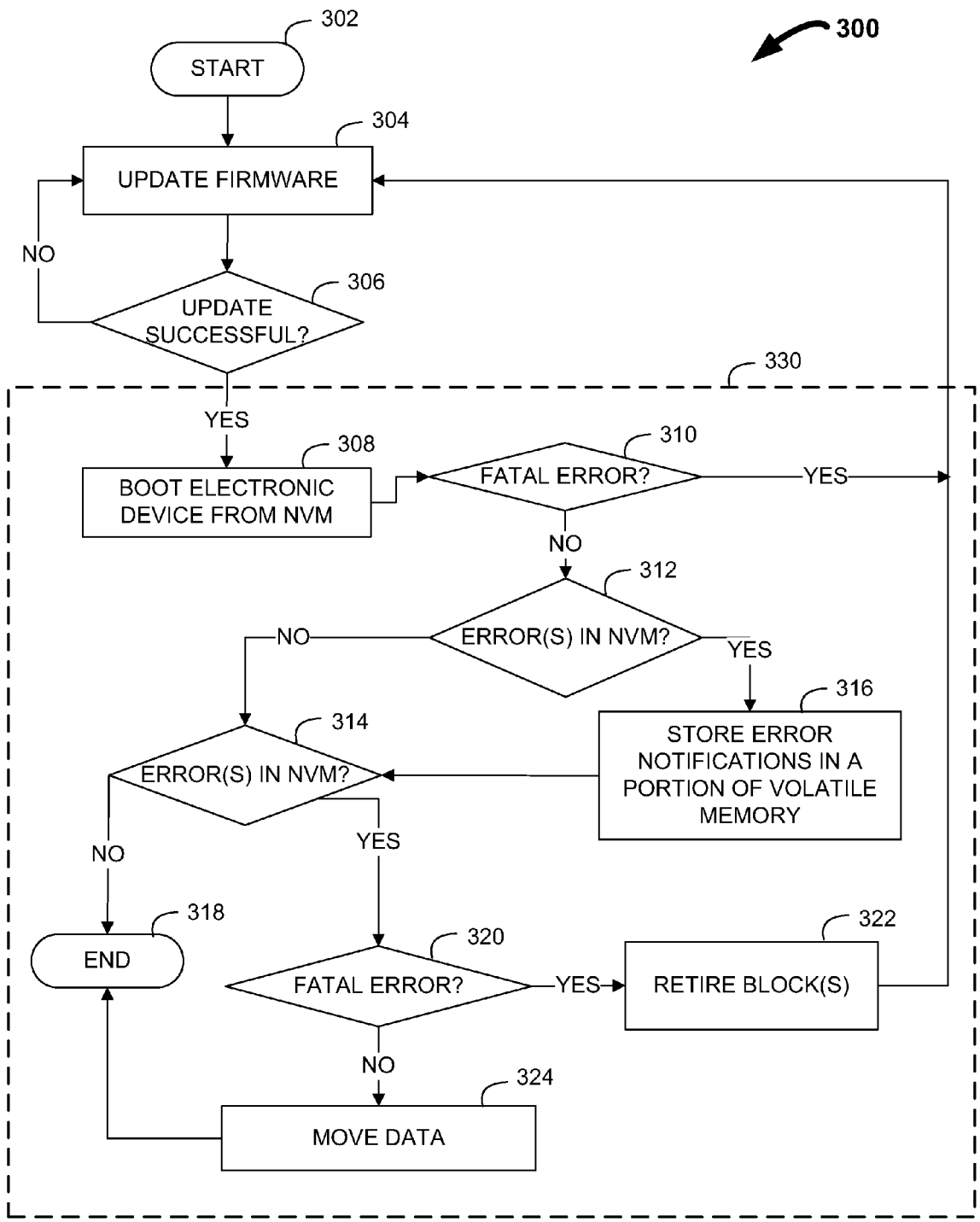
FIG. 3 is a flowchart of an illustrative process for handling errors during device bootup in accordance with various embodiments of the invention.

Referring now to FIG. 3, a flowchart of illustrative process 300 is shown for handling errors during device bootup from a NVM (e.g., NVM 120 of FIG. 1 or NVM 220 of FIG. 2). The steps of process 300 may be executed by a NVM interface (e.g., NVM interface 116 of FIG. 1) capable of interfacing with the NVM, a NVM driver (e.g., NVM driver 117 of FIG. 1) capable of writing data to the NVM, or by any component or combination of components of an electronic device (e.g., electronic device 100 of FIG. 1).

Process 300 may begin at step 302. At step 304, the NVM interface may update the firmware. For example, the firmware may be updated while the electronic device is in factory or during a software download when the device is being used.

Then, at step 306, a determination can be made whether the firmware update was successful. If, at step 306, a determination is made that the firmware update is unsuccessful, process 300 may return to step 304, where the firmware can be updated again.

If, at step 306, a determination is made that the firmware update is successful, process 300 may move to step 308. At step 308, the electronic device can be booted from the NVM. For example, the NVM interface can load a bootloader from the NVM to volatile memory (e.g., memory 114 of FIG. 1 or memory 214 of FIG. 2). Then, using the bootloader, the NVM interface can attempt to load the operating system, kernel, and firmware into the volatile memory. For instance, as shown in FIG. 2, the NVM interface can load bootloader 230 from NVM 220 to memory 214, and bootloader 230 can attempt to load data 232 into memory 214.

Continuing to step 310, a determination can be made whether a fatal error (e.g., a fatal boot loading error) has occurred. Such a fatal error may prevent the electronic device from successfully booting up. If, at step 310, a determination is made that a fatal error has occurred, process 300 may return to step 304, where the NVM interface may attempt to update the firmware again.

If, at step 310, a determination is made that a fatal error has not occurred, process 300 may move to step 312. At step 312, a determination can be made whether at least one error has occurred in the NVM (e.g., one or more errors during the firmware load).

If, at step 312, a determination is made that the at least one error has not occurred in the NVM, process 300 may move to step 314 once the NVM interface has finished loading the operating system, kernel, and firmware into the volatile memory, and the operating system has started up (e.g., the device has reached a writeable context).

However, if, at step 312, a determination is made that the at least one error has occurred in the NVM, process 300 may move to step 316. In some embodiments, the NVM interface can determine that the at least one error has occurred in response to receiving one or more error notifications (e.g., refresh notifications and/or uECC notifications). For example, as shown in FIG. 2, the NVM interface can detect one or more errors 250 in NVM 220.

At step 316, one or more error notifications can be stored in a portion of the volatile memory. For example, as shown in FIG. 2, the NVM interface can store the error notifications in an error log 234 of memory 214. After storing the one or more error notifications, process 300 may move to step 314.

At step 314, a determination can be made if one or more errors in the NVM were detected during the device bootup. For example, a NVM driver (e.g., NVM driver 117 of FIG. 1) can process the error log, and determine if one or more error notifications are stored in the error log.

If, at step 314, a determination is made that that no errors were detected during the device bootup, process 300 may end at step 318. In some embodiments, at a later point in time, the electronic device may be powered down and rebooted. Sub-process 330 may then be initiated, where, at step 308, the electronic device can be booted from the NVM.

If, at step 314, a determination is made that one or more errors were detected during the device bootup, the NVM driver can attempt to correct the one or more errors using the stored error notifications. Accordingly, process 300 may move to step 320.

At step 320, a determination can be made if one or more fatal errors were detected during the device bootup. For example, the NVM driver can determine if the error log includes one or more uECC notifications.

If, at step 320, a determination is made that the errors detected during the device bootup were fatal errors, process 300 may move to step 322. At step 322, the NVM driver can retire one or more blocks associated with the fatal errors. For example, the NVM driver can first identify the associated blocks. The NVM driver can then retire the blocks by copying data stored in the associated blocks to other blocks of the NVM. After copying the data, the associated blocks can be retired from the pool of available programmable blocks. After retiring the blocks, process 300 may return to step 304, where the NVM interface can force a restore of the electronic device. For example, the NVM interface can attempt to update the firmware again.

If, at step 320, a determination is made that the errors detected during the device bootup were not fatal errors, process 300 may move to step 324. For example, the NVM driver may have determined that the one or more errors were non-fatal errors which are not essential for booting.

At step 324, the NVM driver can move data stored in one or more blocks which are associated with the non-fatal error. This preemptive move may prevent the non-fatal error from later developing into a fatal error. For example, the NVM driver can first identify the associated blocks. After identifying the blocks, the NVM driver can write the data stored in the associated blocks to other blocks of the NVM. Process 300 may then end at step 318.

It will be understood that an error log can be maintained and processed during any bootup process of an electronic device (e.g., electronic device 100 of FIG. 2). Thus, steps 308 to 322 (outlined by dotted lines in FIG. 3 and labeled as sub-process 330) can represent the steps taken by a NVM interface and/or NVM driver during any device bootup process. For example, sub-process 330 may begin at step 308 during normal device bootups (e.g., when an electronic device that is running is powered down and rebooted).

It should be understood that the processes of FIG. 3 is merely illustrative. Any of the steps of process 300 and sub-process 330 may be removed, modified, or combined, and any additional steps may be added, without departing from the scope of the invention.

The described embodiments of the invention are presented for the purpose of illustration and not of limitation.

What is claimed is:

1. A method of handling errors in an electronic device, the method comprising:
    booting the electronic device from a non-volatile memory ("NVM") wherein the NVM is NAND flash memory;
    determining if an error has occurred in a memory location of the NVM while data is being loaded from the memory location of the NVM;
    in response to determining that an error has occurred in the memory location, storing at least one error notification in a portion of a volatile memory; and
    correcting the error using the at least one error notification once the electronic device has finished booting.

2. The method of claim 1, further comprising in response to determining that an error has not occurred in the NVM, continuing to boot the electronic device from the NVM.

3. The method of claim 1, wherein the portion of the volatile memory is a memory buffer.

4. The method of claim 1, wherein the portion of the volatile memory is a reserved random-access memory area.

5. The method of claim 1, wherein the correcting comprises:
    determining that the error is a non-fatal error;
    identifying at least one block in the NVM associated with the error; and
    writing data stored in the at least one block to another block in the NVM.

6. The method of claim 1, wherein the correcting comprises: determining that the error is a fatal error; identifying at least one block in the NVM associated with the error; and retiring the at least one block.

7. The method of claim 6, further comprising: forcing a restore of the electronic device; and updating firmware on the electronic device.

8. An electronic device comprising:
    a non-volatile memory ("NVM") wherein the NVM is NAND flash memory;
    volatile memory operative to store an error log; and
    a memory interface operable to access the NVM, wherein the memory interface is operative to:
        load a bootloader from the NVM into the volatile memory;
        load firmware from at least one block of the NVM into the volatile memory using the bootloader;
        determine whether at least one error has occurred in the at least one block of the NVM during the firmware load; and
    in response to determining that the at least one error has occurred, store at least one error notification in the error log.

9. The electronic device of claim 8, wherein the electronic device is in a read-only context while the firmware is being loaded.

10. The electronic device of claim 8, wherein the memory interface is operative to determine that the at least one error has occurred in response to receiving at least one of a refresh notification and an uncorrectable error correction coding notification.

11. The electronic device of claim 8, wherein the memory interface is operative to load an operating system into the volatile memory.

12. The electronic device of claim 8, further comprising a NVM driver operative to write data to the NVM.

13. The electronic device of claim 12, wherein the NVM driver is further operative to:
  process the error log; and
  correct the at least one error.

14. The electronic device of claim 8, wherein in response to determining that the at least one error has not occurred, the memory interface is operative to continue loading the firmware into the volatile memory.

15. A memory interface, comprising:
  control circuitry operative to:
    read firmware from at least one memory location of a non-volatile memory ("NVM") of an electronic device to a volatile memory of the electronic device in a read-only context, wherein the NVM is NAND flash memory;
    detect at least one error in the firmware that is read indicating at least one of a non-fatal and fatal error of the at least one memory location; and
  a NVM driver that is operative to correct the at least one error once the electronic device has reached a writeable context.

16. The memory interface of claim 15, wherein the control circuitry is operative to store at least error notification in a portion of the volatile memory.

17. The memory interface of claim 15, wherein the NVM driver is operating in a writeable context.

18. The memory interface of claim 15, wherein the NVM driver is operative to:
  determine that the at least one error is associated with a non-fatal error;
  identify at least one block of the NVM associated with the non-fatal error; and
  move data stored in the at least one block to at least one other block of the NVM.

19. The memory interface of claim 15, wherein the NVM driver is operative to:
  determine that the at least one error is associated with a fatal error;
  identify at least one block of the NVM associated with the fatal error;
  copy data to at least one other block of the NVM; and
  retire the at least one block.

* * * * *